Dec. 22, 1964 S. K. KAMEN ETAL 3,162,758
SYSTEM FOR DETERMINING THE QUOTIENT OF
TWO AMPLITUDE MODULATED SIGNALS
Filed Feb. 27, 1961 2 Sheets-Sheet 1

INVENTORS
SUSAN K. KAMEN
WILLIAM L. RUBIN
BY
Henry Hugg
ATTORNEY

INVENTORS
SUSAN K. KAMEN
WILLIAM L. RUBIN
BY
ATTORNEY

United States Patent Office 3,162,758

Patented Dec. 22, 1964

3,162,758

SYSTEM FOR DETERMINING THE QUOTIENT OF TWO AMPLITUDE MODULATED SIGNALS

Susan K. Kamen, Jamaica Estates, and William L. Rubin, Whitestone, N.Y., assignors to Sperry Rand Corporation, Great Neck, N.Y., a corporation of Delaware Filed Feb. 27, 1961, Ser. No. 91,973

7 Claims. (Cl. 235—196)

The present invention relates to analogue dividers and, more particularly, to a divider system for obtaining the quotient of two quantities each of which is represented by a respective amplitude modulated signal.

Analogue devices for obtaining the quotient of two quantities are well known for their relative simplicity compared to arrangements utilizing digital techniques. Digital dividers, on the other hand, have the compensatory advantage of producing quotients which approach the exact mathematical quotient to an abitrary degree of precision. Another advantage of digital devices is that the mathematical operation may be completed in a relatively brief interval of time. Analogue type dividers generally are characterized as requiring longer time intervals.

It is the principal object of the present invention to provide an analogue system for obtaining the quotient of two quantities in a very short time interval.

Another object is to provide a dividing system of the analogue type for producing a quotient having a value which approaches the true mathematical quotient to a high degree of exactitude.

An additional object is to provide an analogue divider for obtaining the quotient of two quantities each being represented by a respective amplitude modulated signal.

A further object is to provide a dividing system of the analogue type for obtaining a quotient of two quantities represented by amplitude modulated signals by direct operation on the modulated signals.

These and other objects of the present invention, as will appear from a reading of the following specification, are achieved in a first embodiment by the provision of first and second modulators for amplitude modulating respective carrier signals. Each carrier signal is amplitude modulated by a signal representing a respective divisor and dividend quantity. Thus, each modulator produces an amplitude modulated signal of a respective carrier frequency having an envelope representing a respective one of the divisor and dividend quantities.

The amplitude modulated signal representing the divisor quantity is amplified so as to have greater amplitude than the other modulated signal. The amplified signal and said other modulated signal are then jointly applied to an amplitude limiter whose limiting threshold is exceeded by the amplified signal. An amplitude modulated signal component is developed at the output of the limiter representing the quotient of the envelopes of the signals at the input of the limiter. The carrier frequency of said signal component is identically the same as the carrier frequency of the lesser amplitude (dividend) signal at the input to the limiter. Said signal component is extracted by a bandpass filter coupled to the output of the limiter. An amplitude detector coupled to the output of the bandpass filter recovers the envelope of the modulated signal component which envelope is proportional in amplitude to the desired quotient.

In a second embodiment, the invention provides for analogue multiplication by employing the above-described analogue division process twice. In the first division operation, a signal representing the reciprocal of a first quantity is produced. In the second division operation, a signal representing a second quantity is divided by the signal representing the reciprocal of the first quantity. A resultant signal is produced which represents the product of the first and second quantities.

For a more complete understanding of the present invention, reference should be had to the following specification and to the figures of which:

Figure 1:
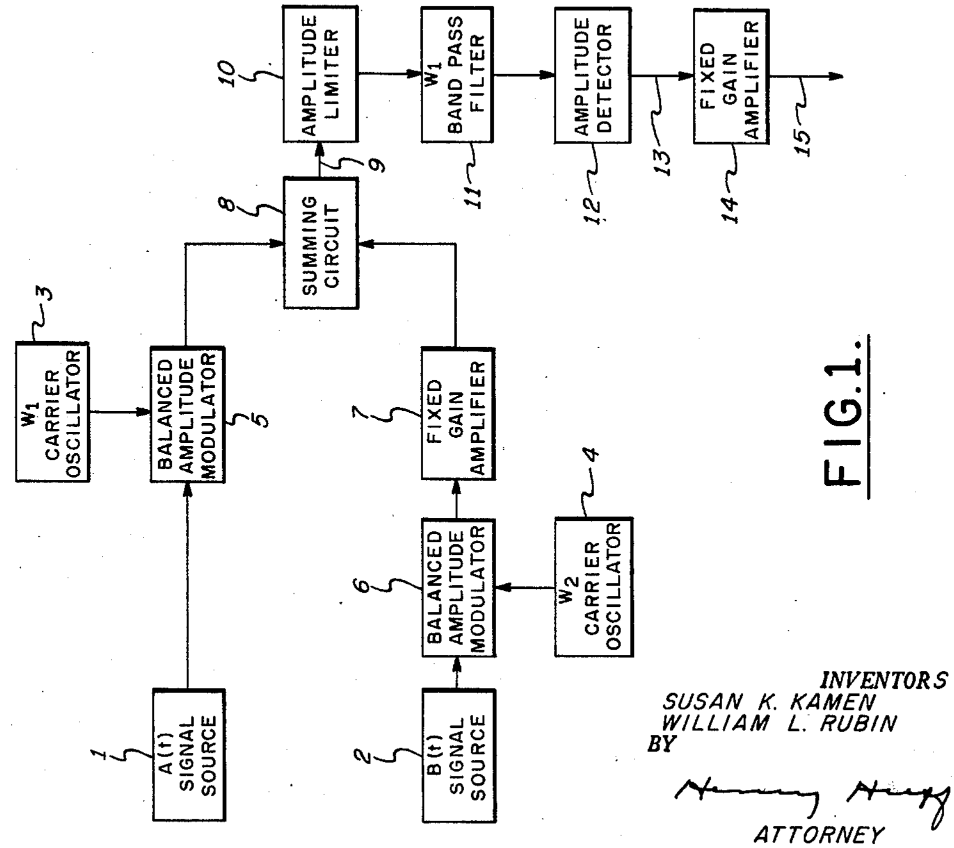
FIG. 1 is a block diagram of a first embodiment adapted for the division of two signals representing respective quantities.

Referring to FIG. 1, the two quantities A(*t*) and B(*t*) to be divided are represented by respective signals. The signal representing the dividend A(*t*) is produced by source 1. The signal representing the divisior B(*t*) is produced by source 2. Oscillator 3 produces a carrier signal of frequency $\omega_1$. Oscillator 4 produces a carrier signal of frequency $\omega_2$. The signals produced by source 1 and oscillator 3 are applied to a conventional balanced amplitude modulator 5, wherein the signal A(*t*) amplitude modulates the carrier of frequency $\omega_1$. Similarly, the signals produced by source 2 and oscillator 4 are applied to a conventional balanced amplitude modulator 6 wherein the signal B(*t*) amplitude modulates the carrier of frequency $\omega_2$.

For a reason to be explained later, the modulated signal at the output of modulator 6 is first amplified in fixed gain amplifier 7 and then applied to a first input of summing circuit 8. The amplitude modulated signal at the output of modulator 5 is directly applied to the second input of summing circuit 8. The combined signal I(*t*) appearing on line 9 at the output of circuit 8 may be represented by the expression:

$$I(t)=A(t)\cos\omega_1 t+KB(t)\cos\omega_2 t \quad (1)$$

where $$\omega_2=\omega_1\pm\omega_d \quad (2)$$

and K is the gain factor of amplifier 7. Substituting expression (2) in expression (1) there results:

$$I(t)=A(t)\cos\omega_1 t+KB(t)\,[\cos\omega_1 t\cos\omega_d t\mp\sin\omega_d t\sin\omega_1 t] \quad (3)$$

Rearranging expression (3), $$I(t)=[A(t)+KB(t)\cos\omega_d t]\cos\omega_1 t\mp[KB(t)\sin\omega_d t]\sin\omega_1 t \quad (4)$$

It can be shown that the summation of two amplitude modulated signals such as represented by expression (4) may be expressed in either of the two following equivalent forms:

$$I(t)=X(t)\cos\omega_1 t+Y(t)\sin\omega_1 t \quad (5)$$

$$I(t)=\sqrt{X^2+Y^2}\cos\left[\omega_1 t-\tan^{-1}\frac{Y(t)}{X(t)}\right] \quad (6)$$

By comparing expressions (4) and (5) it can be seen, $$X(t)=A(t)+KB(t)\cos\omega_d t \quad (7)$$

and $$Y(t)=\mp KB(t)\sin\omega_d t \quad (8)$$

Substituting expressions (7) and (8) in expression (6) there results:

$$I(t)=G(t)\cos\left[\omega_1 t-\tan^{-1}\frac{\mp KB(t)\sin\omega_d t}{A(t)+KB(t)\cos\omega_d t}\right] \quad (9)$$

where:

$$G(t)=\sqrt{[A(t)+KB(t)\cos\omega_d t]^2+[KB(t)\sin\omega_d t]^2}$$

The subsequent development is based upon the principle stated in Davenport and Root, "An Introduction to the Theory of Random Signals and Noise," McGraw-Hill, 1958, page 288, that when the input signal to an ideal band pass limiter is a narrow band wave, the output signal from said limiter is a purely phase modulated wave with the phase modulation of the output signal being identical to the phase modulation of the input signal. The concept of a narrow band wave implies that after passing through a nonlinear device such as a limiter, the spectral components of the wave can be separated so that its harmonics and cross-products do not overlap in the desired bandpass. Thus it can be shown that where the expression $V(t) \cos [\omega_1(t)-\theta(t)]$ represents the input narrow band wave, the output wave from the limiter can be represented by $$L(t)=\frac{4T}{\pi}\cos\left[\omega_1 t-\theta_t\right] \quad (10)$$

where T represents the limiting threshold of the limiter. By comparing expressions (9) and (10) it can be seen that $$\theta_t=\tan^{-1}\frac{\mp KB(t)\sin\omega_d t}{A(t)+KB(t)\cos\omega_d t} \quad (11)$$

Therefore $$\sin\theta_t=\frac{\mp\sin\omega_d t}{\sqrt{1+\frac{2A(t)}{KB(t)}\cos\omega_d t+\frac{A^2(t)}{K^2B^2(t)}}} \quad (12)$$

and $$\cos\theta_t=\frac{\frac{A(t)}{KB(t)}+\cos\omega_d t}{\sqrt{1+2\frac{A(t)}{KB(t)}\cos\omega_d t+\frac{A^2(t)}{K^2B^2(t)}}} \quad (13)$$

Expanding expression (10), there results:

$$L(t)=\frac{4T}{\pi}[\cos\omega_1 t\cos\theta_t+\sin\omega_1 t\sin\theta_t] \quad (14)$$

Substituting expressions (12) and (13) into expression (14), there results:

$$L(t)=\frac{4T}{\pi}\left[\frac{\frac{A(t)}{KB(t)}\cos\omega_1 t+\cos(\omega_1\pm\omega_d)t}{\sqrt{1+\frac{2A(t)}{KB(t)}\cos\omega_d t+\frac{A^2(t)}{K^2B^2(t)}}}\right] \quad (15)$$

It is convenient to rewrite the denominator $$\left[1+\left(\frac{2A(t)}{KB(t)}\cos\omega_d t+\frac{A^2(t)}{K^2B^2(t)}\right)\right]^{-1/2}$$

of expression (15) in terms of the equivalent binominal expansion:

$$\left[1-\frac{A^2(t)}{2K^2B^2(t)}+\ldots\right]-\left[\frac{A(t)}{KB(t)}-\frac{3}{2}\frac{A^3(t)}{K^3B^3(t)}+\ldots\right]\cos\omega_d t+\left[\frac{3A^2(t)}{2K^2B^2(t)}-\frac{15A^4(t)}{4K^4B^4(t)}+\ldots\right]\cos^2\omega_d t-\ldots \quad (16)$$

Substituting expression (16) into expression (15), when A is much less than KB, there results:

$$L(t)\cong\frac{4T}{\pi}\left[\frac{A(t)}{2KB(t)}\cos\omega_1 t\right]+\left[1-\frac{A^2(t)}{2KB^2(t)}\right]\cos(\omega_1+\omega_d)t+\ldots \quad (17)$$

Expression (17) describes the signal which is produced at the output of amplitude limiter 10 of FIG. 1. By inspection of expression (16), it can be seen that the first term thereof represents an amplitude modulated signal of carrier frequency $\omega_1$ having an envelope proportional to the quotient $$\frac{A(t)}{B(t)}$$

All of the succeeding terms of expression (16) represents signals at other frequencies. The amplitude modulated signal of carrier frequency $\omega_1$ is extracted by means of bandpass filter 11 which is connected to the output of limiter 10. All other signal components represented by expression (16) are rejected by filter 11. The extracted amplitude modulated carrier is detected by amplitude detector 12 to produce on output line 13 a signal represented by the expression:

$$L(t)\cong\frac{2T}{\pi K}\frac{A(t)}{B(t)}$$

It can be seen that the detected signal is proportional to the quotient of A($t$) and B($t$), the constant of proportionality being $$\frac{2T}{\pi K}$$

By arranging the gain of fixed gain amplifier 14 to be equal to the reciprocal $$\left(\frac{\pi K}{2T}\right)$$

of said constant, a resultant signal representing $$\frac{A(t)}{B(t)}$$

is produced on output line 15.

Figure 2:
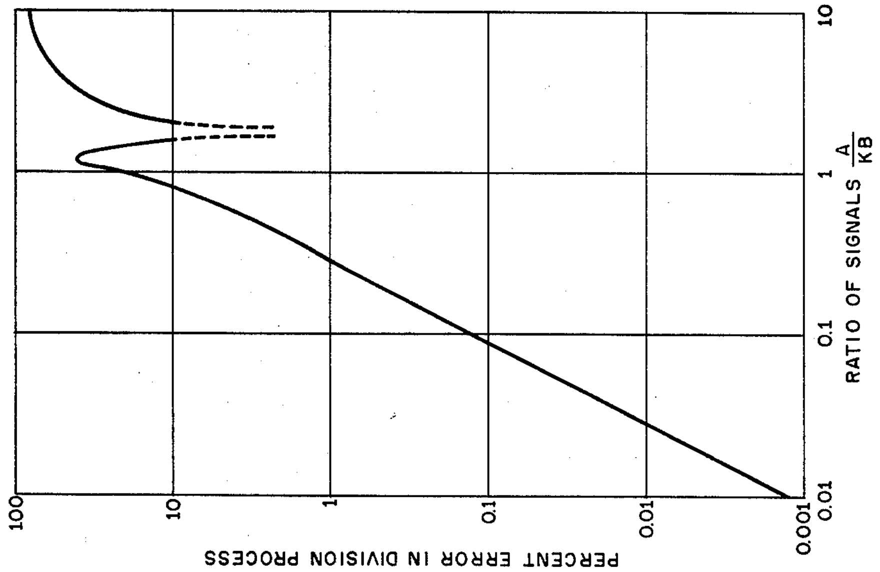
FIG. 2 is a graph representing a design parameter of the present invention.

It should be noted that expression (17) is a first order approximation whose validity is based upon the assumption that the amplitude of A($t$) is very much less than the amplitude of B($t$) and that the amplitude of B($t$) exceeds the limiting threshold T of limiter 10. The required relationships are largely determined by the gain of fixed gain amplifier 7. In general, as the amplitude of B($t$) increases relative to the amplitude of A($t$), the resultant signal of line 15 more nearly approaches the exact value of the true quotient of A($t$) and B($t$). This is depicted in the graphical plot of FIG. 2 wherein the ordinate represents the deviation in percent of said resultant signal from the true quotient and the abscissa represents the ratio $A/KB$.

Figure 3:
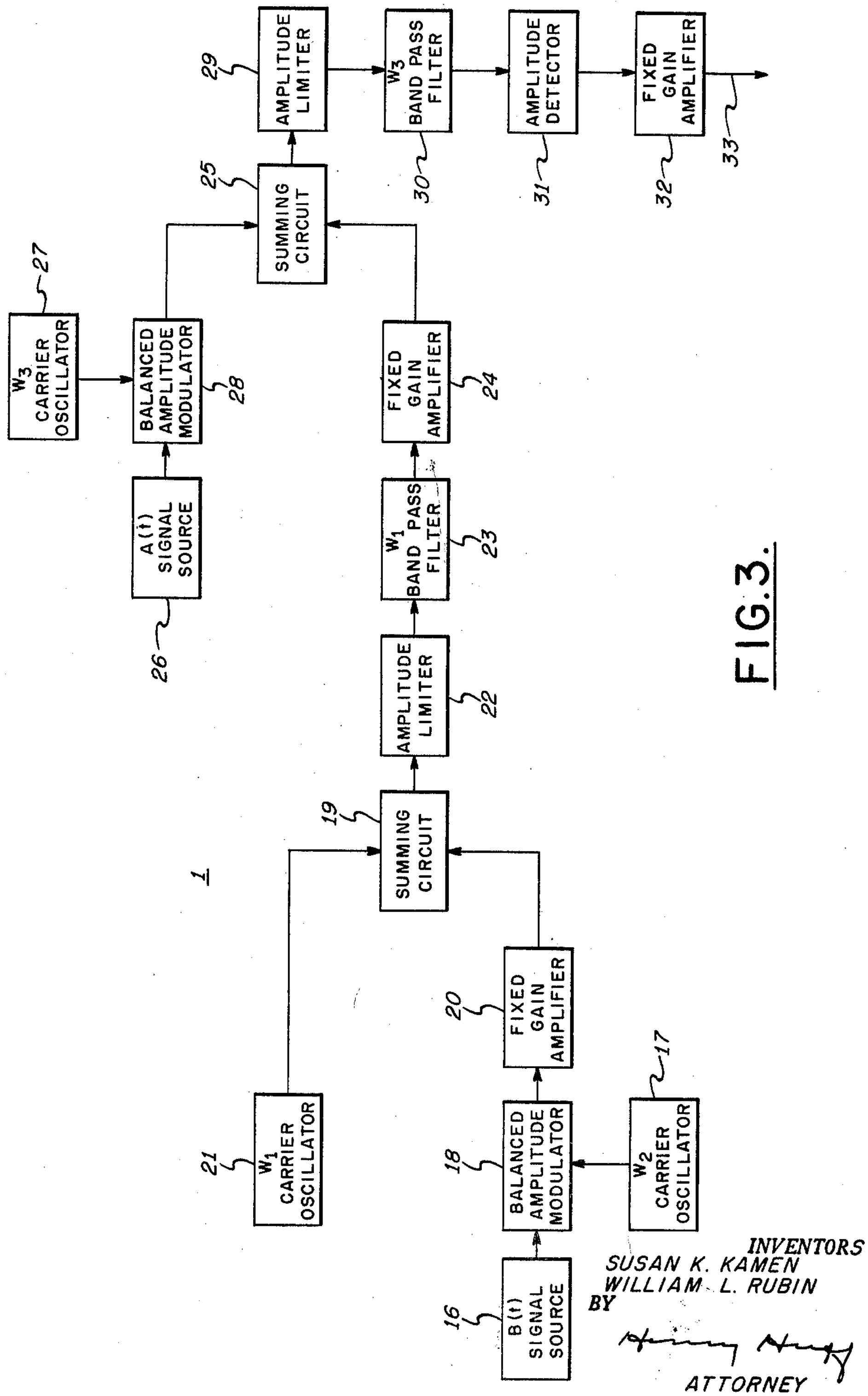
FIG. 3 is a block diagram of a second embodiment adapted for the multiplication of two signals representing respective quantities.

Provision is made in the embodiment of FIG. 3 for carrying out the process of analogue multiplication. It will be seen that the alternative embodiment is essentially a twofold combination of the analogue division system of FIG. 1. In a first division operation, a signal representing the reciprocal of a first quantity is produced. In a subsequent division operation, a signal representing a second quantity is divided by the signal representing the reciprocal of the first quantity. The resultant signal represents the product of the first and second quantities.

Referring to FIG. 3, the signal representing a first quantity B($t$) is produced by source 16. A carrier signal of frequency $\omega_2$ is generated by oscillator 17. The B($t$) signal amplitude modulates the $\omega_2$ carrier in balanced amplitude modulator 18. The resulting amplitude modulated carrier is coupled to a first input of summing circuit 19 via amplifier 20 with fixed gain $K_2$. An unmodulated carrier signal of frequency $\omega_1$ and constant amplitude $K_1$ is produced by oscillator 21 and directly applied to the second input of summing circuit 19.

The combined signals at the output of circuit 19 are operated upon by amplitude limiter 22 and bandpass filter 23 which are connected in cascade to the output of circuit 19. In a manner equivalent to that described in connection with the corresponding structure of FIG. 1, it can be shown that when $K_2B(t)$ is much greater than $K_1$, a signal $L_1(t)$ is produced at the output of filter 23 in accordance with the expression:

$$L_1(t)\cong\frac{2T_1}{\pi K_2}\frac{K_1}{B(t)}\cos\omega_1 t \quad (18)$$

where $T_1$ represents the limiting threshold of limiter 22. The signal represented by expression (18) is applied to a first input of summing circuit 25 via amplifier 24. The gain of amplifier 24 is made equal to $K_3$.

The signal representing a second quantity $A(t)$ is produced by source 26. A carrier signal of frequency $\omega_3$ is produced by oscillator 27. The signal $A(t)$ amplitude modulates carrier $\omega_3$ in balanced amplitude modulator 28. The amplitude modulated signal is applied to the second input of summing circuit 25. The combined amplitude modulated signals at the output of summing circuit 25 are operated upon by amplitude limiter 29, bandpass filter 30 and amplitude detector 31 which are connected in cascade to the output of circuit 25. In accordance with the analysis used in describing the operation of the dividing system of FIG. 1, it can be shown that a resultant signal $L_2(t)$ is produced at the output of amplitude detector 31 which may be represented by the expression:

$$L_2(t) \cong \frac{K_2T_2}{K_1K_3T_1}A(t)B(t)$$

where the factor $K_2$ is the gain of amplifier 20 and $K_3$ is the gain of amplifier 24 and $T_2$ is the threshold of limiter 29. The constant of proportionality may be reduced to unity by designing the gain of amplifier 32 to be equal to the reciprocal quantity $$\frac{K_1K_3T_1}{K_2T_2}$$

Thus, there is finally produced on input line 33 a signal representing the product $A(t)B(t)$.

By inspection of the embodiments of FIGS. 1 and 3, it will be observed that although analogue techniques have been employed, no components having appreciable electrical or mechanical inertia are required. Consequently, the quotient signal and the product signal of the two embodiments are generated essentially instantaneously upon the application of the signals representing the input quantities $A(t)$ and $B(t)$. By the simple expedient of providing sufficient gain in the fixed gain amplifiers, any desired degree of precision may be obtained in the division and multiplication processes. Thus, the advantages of the prior art digital and analogue systems have been combined.

For the sake of simplicity and clarity of exposition, only a pair of input signals $A(t)$ and $B(t)$ have been considered in describing each of the division and multiplication embodiments. It should be noted, however, that three or more input signals may be processed at the same time. For example, more than one signal representing respective dividend quantities can be operated upon simultaneously by the same signal representing a comon divisor quantity. It is only necessary that each dividend signal have a different carrier frequency within the bandpass of the limiter and that a separate bandpass filter be provided at the output of the limiter for passing each quotient signal at a respective one of the different carrier frequencies.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A system for determining the quotient of a divisor quantity and a dividend quantity, said divisor quantity being represented by a first amplitude modulated signal of a first carrier frequency and said dividend quantity being represented by a second amplitude modulated signal of a second carrier frequency, the amplitude of said first signal being greater than the amplitude of said second signal, said system comprising means for summing said first and second signals, an amplitude limiter coupled to the output of said last-named means, and a bandpass filter coupled to the output of said limiter, the pass band of said filter being centered on said second carrier frequency.

2. A system for producing an output signal proportional to the quotient of a divisor quantity and a dividend quantity, said divisor quantity being represented by a first amplitude modulated signal of a first carrier frequency and said dividend quantity being represented by a second amplitude modulated signal of a second carrier frequency, the amplitude of said first signal being greater than the amplitude of said second signal, said system comprising means for summing said first and second signals, an amplitude limiter coupled to the output of said last-named means, a bandpass filter coupled to the output of said limiter, the pass band of said filter being centered on said second carrier frequency, and an amplitude detector coupled to the output of said filter, said amplitude detector producing said output signal.

3. A system for determining the quotient of a divisor quantity and a dividend quantity, said divisor quantity being represented by the amplitude of a first signal and said dividend quantity being represented by the amplitude of a second signal, means for amplitude modulating a first carrier frequency wave with said first signal, means for amplitude modulating a second carrier frequency wave with said second signal, a signal summing circuit, the amplitude modulated second carrier frequency wave being applied to said summing circuit, fixed gain amplifier means for applying the amplitude modulated first carrier frequency wave to said summing circuit, an amplitude limiter coupled to the output of said summing circuit and a bandpass filter coupled to the output of said limiter, the pass band of said filter being centered on said second carrier frequency.

4. A system for producing an output signal proportional to the quotient of a divisor quantity and a dividend quantity, said divisor quantity being represented by the amplitude of a first signal and said dividend quantity being represented by the amplitude of a second signal, means for amplitude modulating a first carrier frequency wave with said first signal, means for amplitude modulating a second carrier frequency wave with said second signal, a signal summing circuit, the amplitude modulated second carrier frequency wave being applied to said summing circuit, fixed gain amplifier means for applying the amplitude modulated first carrier frequency wave to said summing circuit, an amplitude limiter coupled to the output of said summing circuit, a bandpass filter coupled to the output of said limiter, the pass band of said filter being centered on said second carrier frequency, and an amplitude detector coupled to the output of said filter, said amplitude detector producing said output signal.

5. A system for determining the reciprocal of an input quantity, said input quantity being represented by an amplitude modulated signal having a first carrier frequency, a source of second signal having a second carrier frequency, the amplitude of said amplitude modulated signal being greater than the amplitude of said second signal, a signal summing circuit, said amplitude modulated signal and said second signal being applied to said circuit, an amplitude limiter coupled to the output of said circuit, and a bandpass filter coupled to the output of said limiter, the pass band of said filter being centered on said second carrier frequency.

6. A system for determining the reciprocal of an input quantity, said input quantity being represented by the amplitude of a first signal, means for amplitude modulating a first carrier frequency wave with said first signal, a source of second signal having a second carrier frequency, a signal summing circuit, said second signal being applied to said circuit, fixed gain amplifier means for applying the amplitude modulated first carrier frequency wave to said summing circuit, an amplitude limiter coupled to the output of said summing circuit, and a bandpass filter coupled to the output of said limiter, the pass band of said filter being centered on said second carrier frequency.

7. A system for producing an output signal proportional to the reciprocal of an input quantity, said input quantity being represented by the amplitude of a first signal, means for amplitude modulating a first carrier frequency wave with said first signal, a source of second signal having a second carrier frequency, a signal summing circuit, said second signal being applied to said circuit, fixed gain amplifier means for applying the amplitude modulated first carrier frequency wave to said summing circuit, an amplitude limiter coupled to the output of said summing circuit, a bandpass filter coupled to the output of said limiter, the pass band of said filter being centered on said second carrier frequency, and an amplitude detector coupled to the output of said filter, said amplitude detector producing said output signal.

References Cited in the file of this patent

UNITED STATES PATENTS

| | | |
|---|---|---|
| 2,819,017 | Palmer | Jan. 7, 1958 |
| 2,902,218 | Meyer | Sept. 1, 1959 |
| 3,092,720 | De Vrijer et al. | June 4, 1963 |